(12) United States Patent
Epshetsky

(10) Patent No.: US 8,758,666 B2
(45) Date of Patent: Jun. 24, 2014

(54) APPARATUS FOR FABRICATING PARTS AND METHOD OF FORMING THE APPARATUS

(75) Inventor: Yefim Epshetsky, Schaumburg, IL (US)

(73) Assignee: Aktiebolaget SKF, Gothenburg (SE)

( * ) Notice: Subject to any disclaimer, the term of this patent is extended or adjusted under 35 U.S.C. 154(b) by 195 days.

(21) Appl. No.: 13/307,993

(22) Filed: Nov. 30, 2011

(65) Prior Publication Data
US 2013/0134628 A1 May 30, 2013

(51) Int. Cl.
*B29B 7/00* (2006.01)
(52) U.S. Cl.
USPC ............ 264/328.11; 264/297.1; 264/297.3; 264/297.6; 264/328.8; 425/575; 425/588
(58) Field of Classification Search
USPC ........ 264/297.1, 297.3, 297.6, 328.8, 328.11; 425/575, 588
See application file for complete search history.

(56) References Cited

U.S. PATENT DOCUMENTS

| 4,521,172 A | 6/1985 | Gilbert |
| 5,302,103 A | 4/1994 | Brown et al. |
| 7,198,480 B2 * | 4/2007 | Imai ............................. 425/556 |
| 2009/0256281 A1 | 10/2009 | Kim et al. |

* cited by examiner

*Primary Examiner* — Timothy Kennedy
*Assistant Examiner* — David N Brown, II
(74) *Attorney, Agent, or Firm* — Inventa Capital PLC

(57) ABSTRACT

An apparatus for receiving a plurality of mold assemblies having a first mold portion and a second mold portion operably connected together for forming parts. The apparatus includes a mold holding member and a pair of spaced apart support members extending from the mold holding member to a manufacturing floor. A carriage device is cooperable with the mold holding member for engaging and moving the mold assembly. A lifting mechanism is used for moving the carriage device relative the mold holding member to move the mold assembly to be engaged with mold holding member. A turn table adjacent to the mold holding member holds the mold assemblies and is movable relative the mold holding member thereby replacing the mold assemblies. A controller is operably connected to the mold holding member and the turn table thereby moving the turn table relative the mold holding member to interchange the mold assemblies.

23 Claims, 5 Drawing Sheets

APPARATUS FOR FABRICATING PARTS AND METHOD OF FORMING THE APPARATUS

FIELD OF THE INVENTION

The present invention relates to molding machines particularly, but not exclusively for use in the molding of rubber or plastics wherein the molding machine includes quick-change features.

BACKGROUND OF THE INVENTION

Injection molding is a manufacturing process for producing parts from both thermoplastic and thermosetting plastic materials. Material is fed into a heated barrel, mixed, and forced into a mold cavity where it cools and hardens to the configuration of the mold cavity. After a product is designed, usually by an industrial designer or an engineer, molds are made by a moldmaker (or toolmaker) from metal, usually either steel or aluminum, and precision-machined to form the features of the desired part. Injection molding is widely used for manufacturing a variety of parts, from the smallest component to entire body panels of cars.

A typical injection molding machine includes multiple components designed to transform stock material into a batch of molded products. The operational components of the injection molding machine usually include a stock supply assembly, an extruder assembly, an injection assembly, a press assembly and a mold pallet assembly. It is highly desirable for a single injection molding machine to produce several different batches of molded products, such as different products of various configurations and used in different industrial applications.

During a typical multi-batch manufacturing shift, a first batch of molded products is created during a first production run. To begin this first production run, a first mold assembly having a first mold configuration reflecting the desired shape of a first product to be molded, is installed into the injection molding machine. Upon completion of the first production run, a second mold assembly having a second mold configuration reflecting the desired shape of a second product to be molded, is installed into the injection molding machine for the second batch of molded products to be created. In a multi-batch manufacturing process, this second batch of molded product will possess properties different from those of the first batch of molded products. Consequently, in a batch-conversion it is necessary to remove the first mold pallet assembly and replace it with a second mold pallet assembly.

The art of molding machines used in injection molding applications is replete with various designs as taught by U.S. Pat. No. 4,521,172 to Gilbert; U.S. Pat. No. 5,302,103 to Brown et. al; and United States Patent Application Publication No. 20090256281 to Kim et al. The U.S. Pat. No. 5,302,103 to Brown et. al., for example, teaches an injection molding machine having a lower support situated at the unloading/loading position and upper and lower mold-mounting devices located in the mold-receiving/releasing condition. A mold pallet assembly is positioned in a closed condition on a mold transport table. The mold transport table is a rolling table with a top surface approximately coplaner with the lower support in the unloading/loading position.

After the molding operation is complete, the mold pallet assembly is shifted from the lower support to the mold transport table to be transported to a suitable storage location. To the extend effective, it will take time to transport the mold pallet assembly positioned on the mold transport table to the storage location, then place another mold pallet assembly to the mold transport table in order to move the mold transport table back to the injection molding machine. This method is time consuming and negatively impacts production time line, which provides numerous opportunities for presenting new systems and methods that will improve the aforementioned injection molding machines as taught by the U.S. Pat. No. 4,521,172 to Gilbert; U.S. Pat. No. 5,302,103 to Brown et. al; and United States Patent Application Publication No. 20090256281 to Kim et al.

Therefore, an opportunity exists for an improved molding apparatus and system adaptable to engage multiple mold assemblies of various configuration for forming various products at a single molding location. Moreover, the opportunity exists for the molding machine configured to withstand deflection and distortion as the molding machine is in operational use with the mold assembly connected to and hanging from a top portion or a mold holding member of the molding machine thereby eliminating offset between the first mold portion and the second mold portion to prevent production of defective parts as the molding apparatus forms the parts.

SUMMARY OF THE INVENTION

A present invention relates to a molding apparatus (the apparatus) used for fabricating parts made from rubber, plastics, metal and metal alloys. The apparatus is used to receive a plurality of mold assemblies, wherein each mold assembly that includes a first mold portion and a second mold portion operably connected with one another to define a cavity therebetween to receive at least one of polymeric, non-polymeric materials for forming parts. Each cavity may include different configuration to form the parts of various shapes, dimensions and purposes.

A movable device such as, for example, a turn table is a part of the apparatus. The turn table is movable from an isolated position to and from the apparatus and rotatable about a central axis of the turn table. The turn table presents a base, a post extending from the base, and a mold support platform for supporting a plurality of the mold assemblies. The mold support platform may present a circular configuration or a plurality of extensions for holding the mold assemblies. The mold support platform includes a plurality of void portions having a diameter or a contour smaller than the size of the mold assembly.

A controller is operable communicated with the turn table and the apparatus for controlling operational modes of the turn table and the apparatus such as moving the turn table to and away from the apparatus, rotating the mold support platform in a predetermined sequential order to position the mold assemblies relative the apparatus.

The apparatus includes a mold holding member presenting opposite surfaces. A pair of support members is spaced from one another and extend from the mold holding member to a manufacturing floor. A carriage device is cooperable with the mold holding member for engaging and moving the mold assembly. The carriage device includes a pair of shafts and interconnected by a mold positioning device. A pin extends from the mold positioning device to push the mold assembly as the pin extends through each of the void portions. The shafts are interconnected by a link The link is pivotably connected to each shaft. The link includes a device presenting a plurality of rollers connected thereto.

A lifting mechanism of the apparatus is used for moving the carriage device relative the mold holding member to move the mold assembly to be engaged with the mold holding member. The lifting mechanism presents a first block, i.e. a female element and a second block, i.e. a male element. Both elements include rollers thereby allowing the elements to move relative each other along the tracks. The female element includes a pair of side walls interconnected by a section thereby forming a gate defined between the side walls. Each side wall includes a first inclined surface and a second inclined surface or slope with each of the surfaces defining different angles in relationship to the horizontal plane of the worksurface.

An actuator (mechanical, electrical, hydraulic) is connected to the section. The controller is also operably connected to the actuator. A threaded shaft is connected to the actuator and extends through the section. The threaded shaft is connected with a female connector defined in the male element. The male element presents a unitary body designed to be disposed in the gate. Similar to the side walls of the female element, the male element includes a first inclined surface and a second inclined surface or slope with each of the surfaces defining different angles in relationship to the horizontal plane of the worksurface.

In operational mode of the apparatus, the turn table is moved to the apparatus and below the mold holding member. As the mold support platform positions the mold assembly below one of the opposite surfaces of the mold holding member, the mold positioning device having the pin extending from the mold positioning device pushes the mold assembly as the pin extends through each of the void portions as the actuator rotates the shaft which meshingly (mechanically) engages the male element. As the male element enters the gate defined by the side walls, the rollers of the engaging surface are captured by a V-shaped seat defined by the second inclined surface or slope of the male element and the second inclined surface or slope of the female element.

As the male element enters the gate of the female element, the rollers slide upwardly over the slopes thereby raising the shafts above the worksurface. After the molding operation is complete, the shafts are lowered downwardly and the mold assembly is landed on the mold support platform. Then the turn table rotates about the central axis to position another mold assembly above the pin and the molding operation begins.

An advantage of the present invention is to provide a molding apparatus that is adaptable to use mold assemblies of various types wherein each mold assembly that includes a first mold portion and a second mold portion operably connected with one another to define a cavity therebetween to receive at least one of polymeric, non-polymeric materials for forming parts of various shapes, dimensions and purposes within short period of time thereby improving production cycle but manufacturing various parts at a single location.

Another advantage of the present invention is to provide the improved apparatus and method for molding various parts wherein the design of the apparatus allows elimination of any potential offset as the first mold portion and the second mold portion present a straight plane parallel with the mold holding member as the mold holding member is prevented from deflection and distortion.

Still another advantage of the present invention is to provide the improved design of the apparatus for forming parts wherein the unique design eliminates offset between the first mold portion and the second mold portion thereby eliminating fabrication of the defective parts.

Still another advantage of the present invention is to provide the improved design of the apparatus that utilized application of opposite forces applied to the mold holding member thereby preventing the mold holding member from being deflected.

Still another advantage of the present invention is to provide the improved apparatus for forming parts that is compact in design and can be utilized in various industrial applications.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE INVENTION

Figure 1:
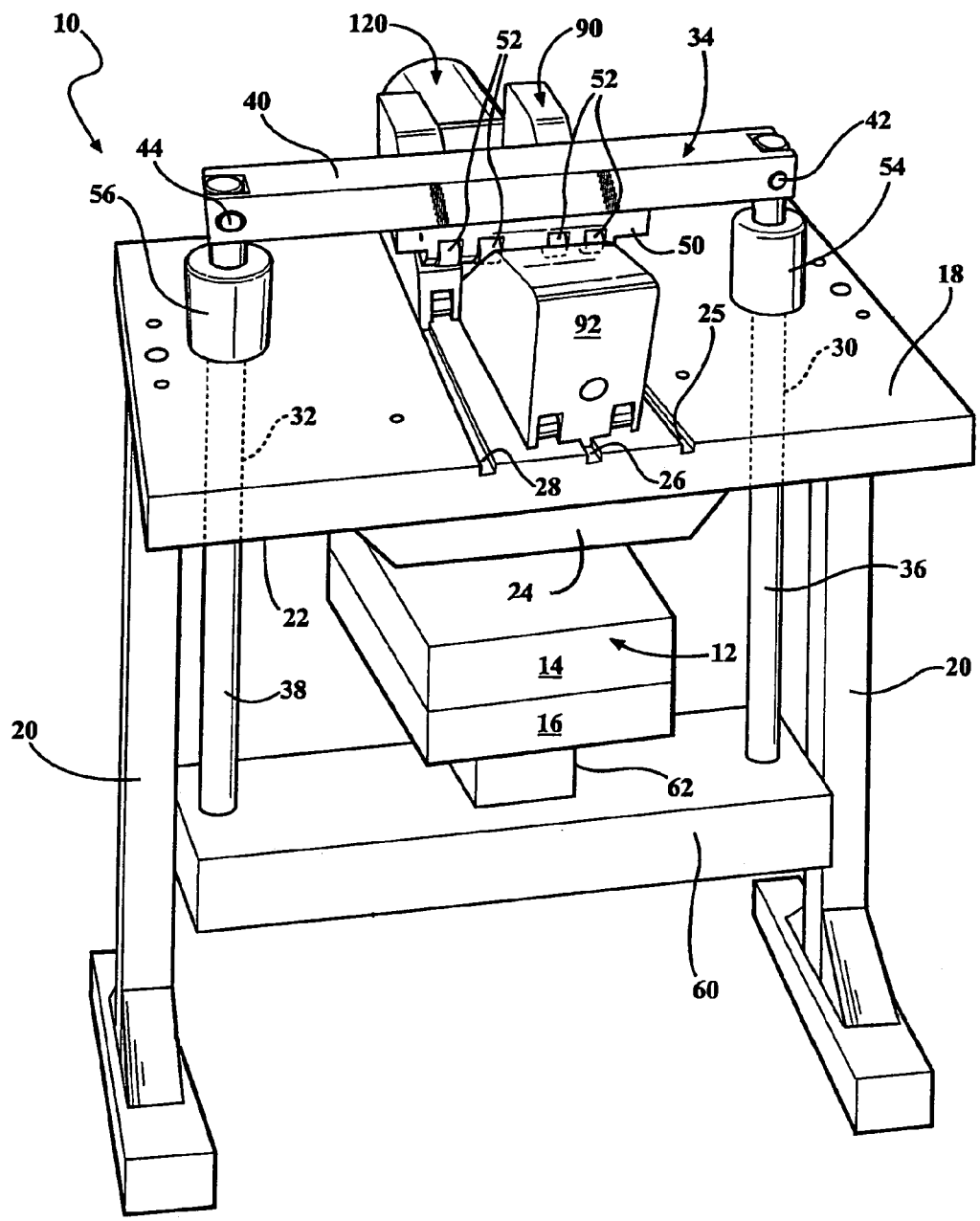
FIG. 1 illustrates a perspective view of an apparatus of the present invention for fabricating parts.

Referring to FIGS. 1 through 5, wherein like numerals indicate like or corresponding parts throughout the several views, a molding apparatus (the apparatus), generally shown at 10, is used for fabricating parts made from rubber, plastics, metal and metal alloys. The apparatus 10 receives a mold assembly, generally indicated at 12 that includes a first mold portion or half 14 and a second mold portion or half 16 operably connected with one another to define a cavity therebetween (not shown) to receive at least one of polymeric, non-polymeric materials for forming parts. Alternatively, the apparatus 10 is also configured to perform stamping operations wherein blanks of at least one of metallic and organic materials (not shown) are placed between the first mold portion 14 and the second mold portion 16 thereby stamping parts (not shown).

A worksurface or a mold holding member 18 includes a supporting member or a pair of support members 20 to position the worksurface 18 above a manufacturing floor (not illustrated). A plurality of tracks 25, 28 and 26 are defined in the worksurface 18. The mold holding member 18 is configured to perform injection molding operations thereby injecting there through at least one of metallic and organic materials between the first mold portion 14 and the second mold portion 16 thereby molding the parts (not shown). The mold holding member 18 includes opposite surfaces (only one is shown at 22). A mold engaging platform 24 is connected to the surface 22. The mold engaging platform 24 is used to receive the mold assembly 12 and inject thereto a polymeric material to form the part. The mold engaging platform 24 is also used for providing metal or metal alloys into the mold assembly 12 to fabricate another part. The mold holding member 18 is configured to perform various injection molding operations thereby injecting through the mold engaging platform 24 at least one of metallic and organic materials between the first mold portion 14 and the second mold portion 16 thereby molding the part. The mold holding member 18 is also configured to perform stamping operations wherein blanks of at least one of metallic and organic materials are placed between the first mold portion 14 and the second mold portion 16 thereby stamping the part.

A pair of inlets 30 and 32 are also defined in the worksurface 18. A carriage device, generally indicated at 34, is used to lift and lower the mold assembly 12 relative the worksurface 18. The carriage device 34 includes a pair of shafts 36 and 38 interconnected by a bar element 40. The shafts 36 and 38 extend through the inlets 30 and 32. The bar element 40 is pivotably connected to each shafts 36 and 38 by respective pins 42 and 44 extending through slots 46 and 48 defined in the bar element 40 and extending through the shafts 36 and 38. The slot 48 presents a substantially oval configuration to form an offset to allow each shaft 36 and 38 includes respective locking elements (not shown) to engage the mold.

Alluding to the above, the bar member 40 includes a device 50 connected to the bar member 40. The device 50 presents a plurality of rollers 52 rotatably connected thereto. The functionality and the purpose of the rollers 52 will be described further below. A pair of tubular members 54 and 56 surround the shaft 36 and 38 thereby improving alignment of the shafts 36 and 38 relative the inlets 30 and 32. The shafts are interconnected by a mold positioning device 60. A pin 62 extends from the mold positioning device 60 to push the mold assembly 12 as the pin extends through each of void portions (shown in phantom at 64 in FIG. 2 and further in FIGS. 3 and 5) defined in a mold support platform as described below.

Figure 2:
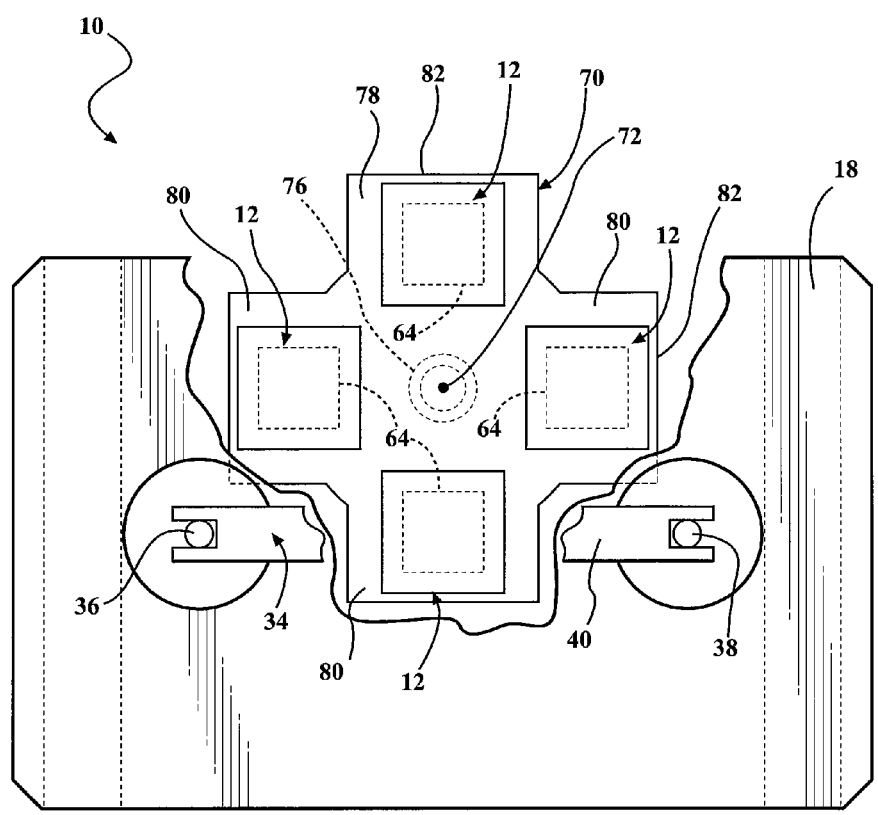
FIG. 2 illustrates a top and partially broken view of the apparatus of the present invention with a movable device positioned adjacent a frame of the apparatus with a plurality of molds positioned thereon.
Figure 3:
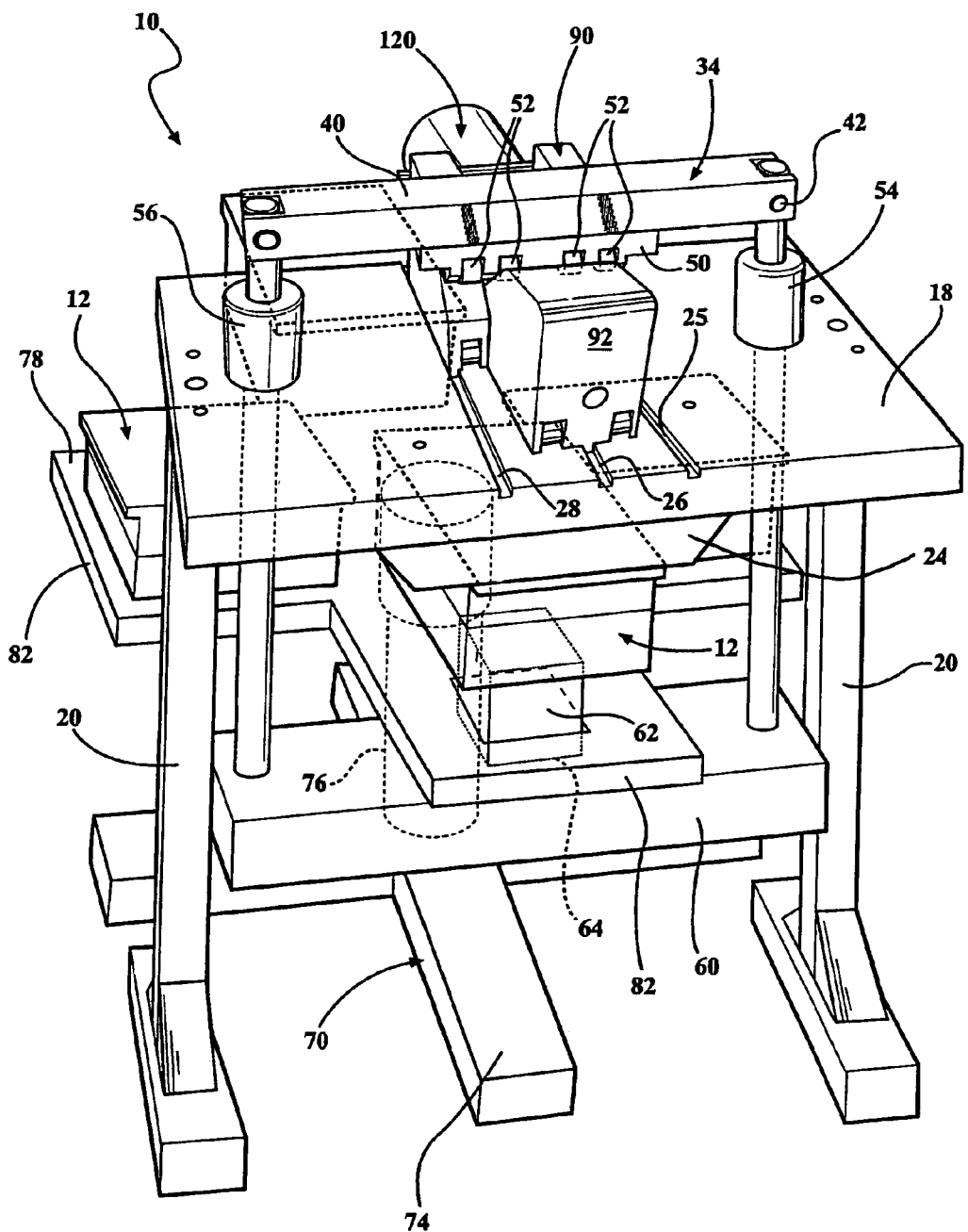
FIG. 3 illustrates a perspective view of the apparatus of the present invention with the movable device positioned adjacent the frame of the apparatus with the plurality of molds positioned thereon.
Figure 4:
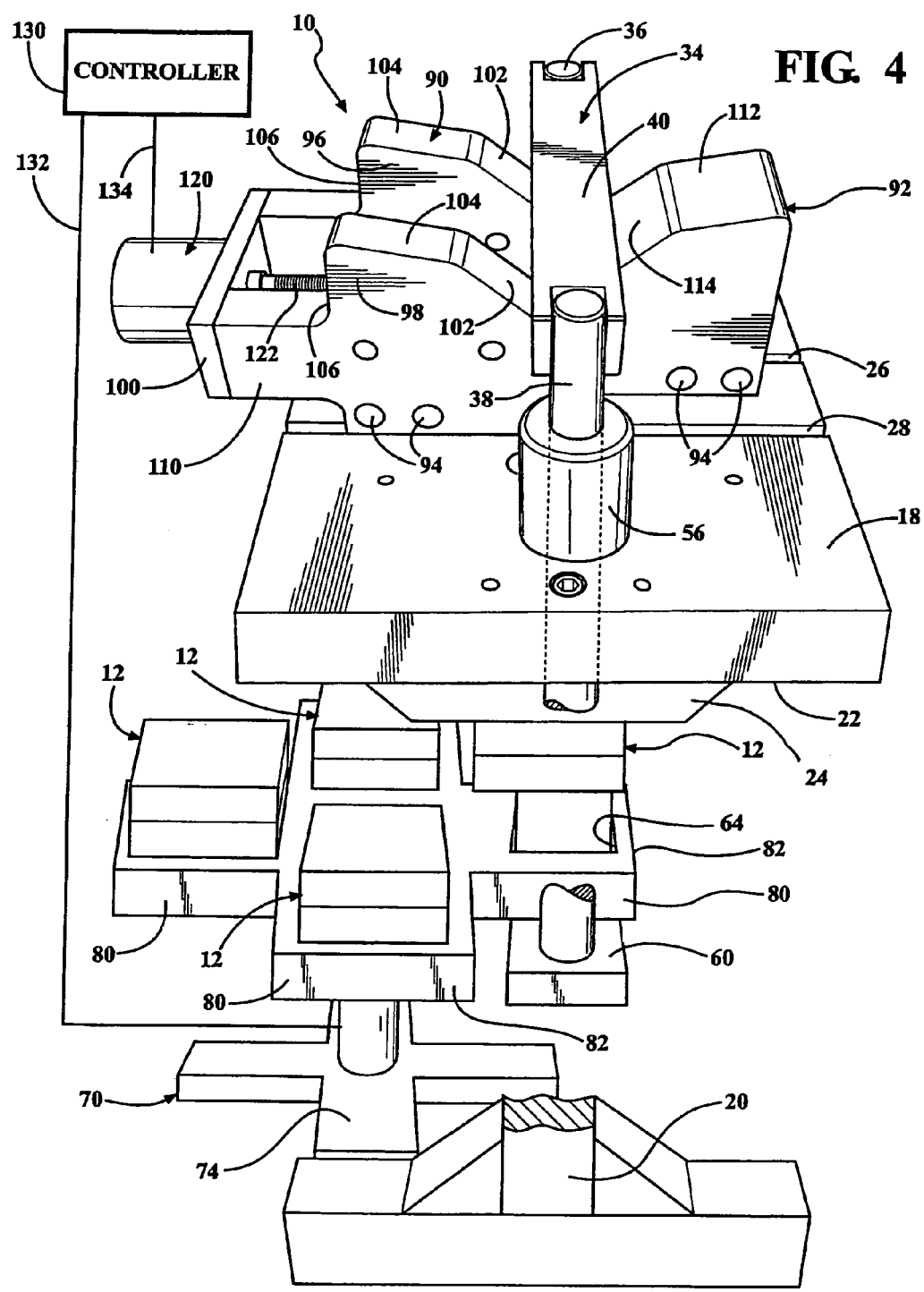
FIG. 4 illustrates a side view of the apparatus of the present invention with the movable device positioned adjacent the frame of the apparatus with the plurality of molds positioned thereon and a controller operably communicated with the apparatus and the movable device for facilitating operational modes of the apparatus.
Figure 5:
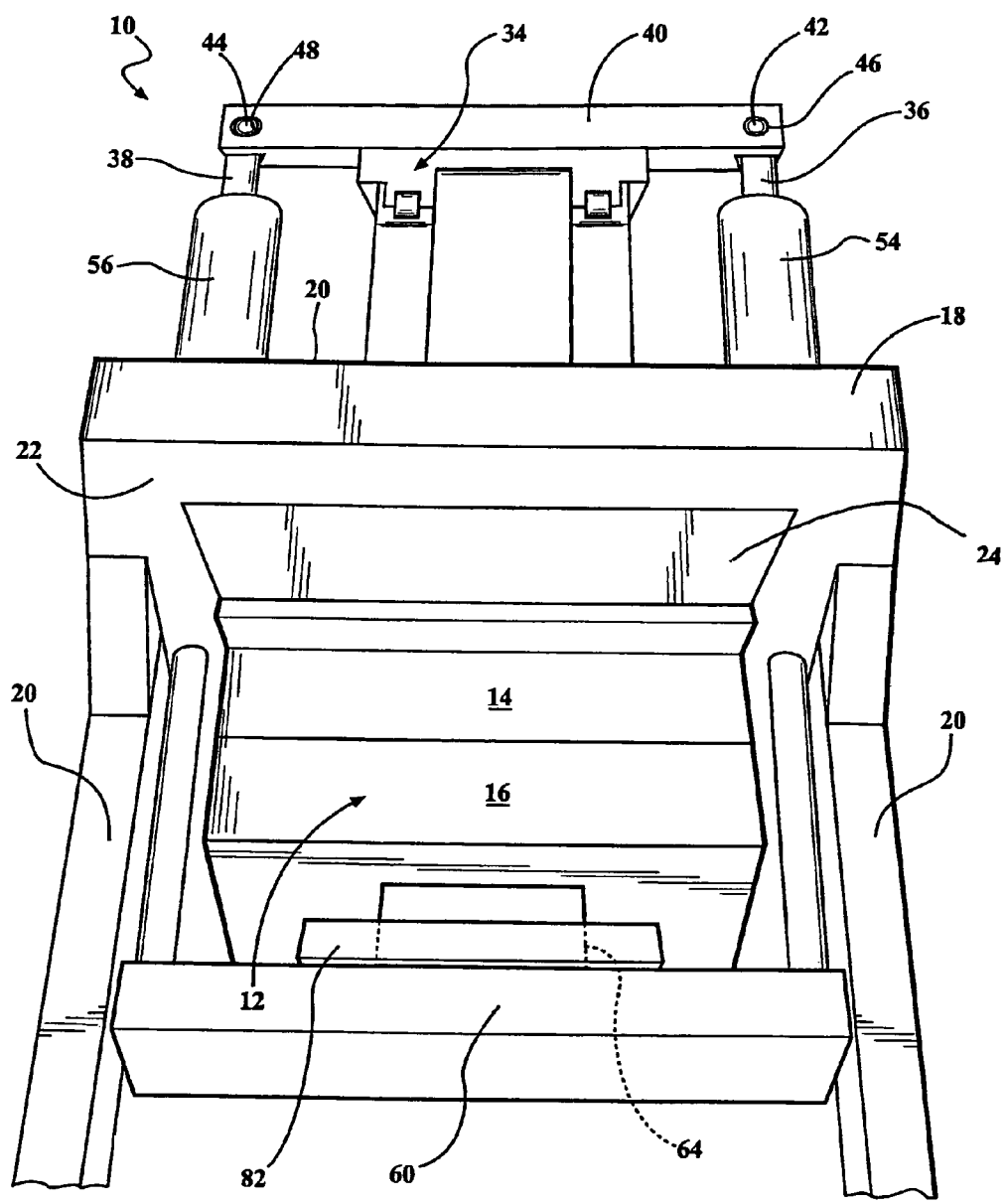
FIG. 5 illustrates another view of the apparatus taken from a bottom.

As best shown in FIGS. 2, 3, and 4, a movable device such as, for example, a turn table is generally indicated at 70. The turn table 70 is a part of the apparatus 10. The turn table 70 is movable to and from the apparatus 10 and rotatable about a central axis 72 of the turn table 70. The turn table 70 presents a base 74, a post 76 extending from the base 74, and the mold support platform 78 for supporting a plurality of the mold assemblies 12. The mold support platform 78 may present a circular configuration (not illustrated) or a plurality of extensions 80 for holding the mold assemblies 12. Each of the extensions 80 defines a terminal edge 82 as the extensions 80 are positioned in a cantilevered fashion. The void portions or voids 64 are located adjacent each terminal edge 82.

Alternatively, the terminal edge 82 may present an open front (not shown) with the void portion 64 being formed with three walls and open gate thereby allowing the turn table 70 to deliver the mold assemblies 12 to the carriage device 34 as the mold assembly 12 is positioned on the mold positioning device 60 and then retract to an isolated position and return back to a mold engaging position as the molding operation is performed. The mold support platform includes a plurality of the void portions 64 having a diameter or a contour smaller than the size of the mold assembly 12. Those skilled in art will appreciate that the configuration and the size of the mold support platform 78 is not intended to limit the scope of the present invention. For example, the number of the extensions 80 may be less than four or more than four.

As best illustrated in FIG. 4, the apparatus 10 includes a lifting device presented by a first block, i.e. a female element, generally indicated at 90, and a second, i.e. a male element, generally indicated at 92. Both elements 90 and 92 include rollers 94 thereby allowing the elements 90 and 92 to move relative each other along the tracks 25, 28 and 26. The female element 90 includes a pair of side walls 96, 98 interconnected by a plate 100 thereby forming a gate defined between the side walls 96, 98 to receive the male element 92.

As best illustrated in FIG. 4, each side wall 96 and 98 of the female element 90 presents an engaging surface defined by a first portion or a first inclined surface 102 and a second portion or a second inclined surface 104 and a back side 106. The back side 106 extends generally perpendicular to the worksurface 18. The back sides 106 of the side walls 96 and 98 include a tail portion 110 extending therefrom and interconnected by the plate 100 to receive the male element 92 as the male and female elements 90 and 92 are movable relative one another thereby moving the carriage device 34 above the worksurface 18.

The male element 92 presents a unitary body designed to be disposed in the gate defined between the side walls 96 and 98. Similar to the side walls of the female element 90, the male element 92 includes a first inclined surface 112 and a second inclined surface or slope 114.

An adjusting device, such as actuator, is generally indicated at 120. The actuator 120 is connected to the plate 100 and includes a threaded shaft 122 mechanically engaged and rotatable relative the male element 92. The actuator 120 may include electrical, mechanical, hydraulic designs and the type, size, and configuration of the actuator 120 is not intended to limit the scope of the present invention. The actuator 120 may be cooperable with other components of the apparatus 10 in order to move the female element 90 and the male element 92 relative one another.

A controller 130 is operable communicated with the turn table 70, as shown at 132, and the apparatus 10, as shown at 134, for controlling operational modes of the turn table 70 and the apparatus 10 such as moving the turn table 70 to and away from the apparatus, rotating the mold support platform 78 in a predetermined sequential order to position the mold assemblies 12 relative the apparatus 10. The controller 130 also manipulates operational modes of the apparatus 10 as will be described further below.

In operational mode of the apparatus 10, the actuator 120 rotates the shaft 122 which meshingly (mechanically) engages the male element 92. As the male element 92 enters the gate defined by the side walls 96 and 98, the rollers 52 of the device 50 are captured by the V-shaped seat (best shown on FIG. 4) to receive the carriage device 34. As the male element 92 enters the gate of the female element 90, the rollers 52 slide upwardly over the surfaces 114 and 102 thereby raising the shafts 36 and 38 above the worksurface 18 in order to move the device 34 at a speed higher that the speed of the carriage device 34 movable along the surfaces 114 and 102.

The actuator 120 operably engaged the male element 92 and the female element 90 allows to move the carriage device 34 at predetermined positions for simultaneously moving the male and female elements 92 and 90 relative to one another and the center of the worksurface 18 at equal distances defined between each of the elements 90 and 92 and the center of the worksurface 18 to move the mold assembly relative the worksurface 18. As the male element 92 is moved out of the gate of the female element 90, the rollers 52 slide downwardly over the surfaces 114 and 102 thereby lowering the shafts 36 and 38 relative the worksurface 18.

As the mold support platform 78 positions the mold assembly 12 below one of the opposite surfaces 22 of the mold holding member 18, the mold positioning device 60 having the pin 62 extending from the mold positioning device 60 pushes the mold assembly 12 as the pin 62 extends through each of the void portions 64 as the actuator 120 rotates the shaft 122 which meshingly (mechanically) engages the male element 92. As the male element 92 enters the gate defined by the side walls 96 and 98, the rollers 52 of the engaging surface 50 are captured by the V-shaped seat defined by the second inclined surface or slope 114 of the male element 92 and the second inclined surface or slope 102 of the female element 90.

After the molding operation is complete, the shafts 36 and 38 are lowered downwardly and the mold assembly 12 is landed on the mold support platform 78. Then the turn table 70 rotates about the central axis 72 to position another mold assembly 12 above the pin 62 and the molding operation begins. The mold support platform 78 can be moved in unison with the shafts 36 and 38 as they are lifted between to a mold engaging position with the mold assembly 12 frictionally and operably engaging the mold engaging platform 24 to receive the polymeric material injection molded into the mold assembly 12. Alternatively, the terminal edge 82 may present the open front (not shown) with the void portion 64 being formed with three walls and open gate thereby allowing the turn table 70 to deliver the mold assemblies 12 to the carriage device 34 as the mold assembly 12 is positioned on the mold positioning device 60 and then retract to the isolated position and return back to the mold engaging position as the molding operation is performed. As the turn table 70 rotates about the central axis 72, it allows the part located inside the mold assembly 12 to cure before the part is removed by a robotic device or operator (both not shown).

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An apparatus for receiving a plurality of mold assemblies each having a first mold portion and a second mold portion operably connected to said apparatus for forming parts, said apparatus comprising:
a mold holding member defining opposite surfaces;
a pair of support members spaced from one another and extending from said mold holding member to space said mold holding member from a manufacturing floor;
a carriage device cooperable with said mold holding member for engaging and moving the mold assembly to one of said opposite surfaces;
a lifting mechanism positioned on the other of said opposite surfaces for moving said carriage device relative said mold holding member to move the mold assembly to be engaged with said mold holding member; and
a device for holding the mold assemblies positioned around said device with said device movable between an isolated position to a mold engaging position for placing the mold assemblies on said carriage device as said carriage device moves one of the mold assemblies to be engaged with one of said opposite surfaces of said mold holding member to inject a material into the mold assembly to form a first part and returning the mold assembly back to said device to receive another mold assembly to form a second part as said device rotates relative said mold holding member thereby continuously feeding said carriage device with the mold assemblies to facilitate continuous cycle of fabricating the first part and the second part, a turn table of said device having a base movable to and away from said mold holding member and a post extending from said base, with said post being adjustable to various heights and rotatable about said central axis.

2. An apparatus as set forth in claim 1, wherein said turn table includes a mold support platform extending to a terminal edge and connected to said post and rotatable in unison with and relative to said post with said mold support platform defining a plurality of voids located at said terminal edge to receive the mold assemblies positioned on and extending beyond said voids.

3. An apparatus as set forth in claim 2, wherein said mold support platform presents a circular configuration.

4. An apparatus as set forth in claim 2, wherein said mold support platform presents a plurality of sections extending from said central axis in a cantilevered fashion to said terminal edge.

5. An apparatus as set forth in claim 1, wherein said carriage device is further defined by a pair of shafts cooperable with said mold holding member and a bar element pivotably connected to said shafts.

6. An apparatus as set forth in claim 5, wherein said carriage device is further defined by a mold positioning device connected to said shafts and a pin extending from said mold positioning device to push the mold assembly as said pin extends through each of said voids defined in said mold support platform.

7. An apparatus as set forth in claim 6, wherein said lifting mechanism is further defined by a first block presenting an engaging surface defined by a first portion and a second portion and a back side with each of said first and second portions presenting different angles defined between said first and second portions and said back side as viewed in a cross section.

8. An apparatus as set forth in claim 7, wherein said lifting mechanism is further defined by a second block having a pair of elements each presenting an engaging surface defined by a first portion and a second portion and a back side with each of said first and second portions of said pair of elements presenting different angles defined between said first and second portions and said back side as viewed in a cross section.

9. An apparatus as set forth in claim 8, wherein said bar element includes a device presenting a plurality of rollers with some of said rollers slidably movable on said engaging surface of said first block and the other of said rollers slidably movable on said engaging surface of said second block.

10. An apparatus as set forth in claim 9, wherein said mold holding member includes at least one track and said at least one of said first and second elements including a track engaging surface to facilitate slidable movement of said first and second blocks on said mold holding member relative said central axis.

11. An apparatus as set forth in claim 10, including a controller is operable communicated with said turn table and said lifting mechanism for controlling operational modes of said turn table and said lifting mechanism thereby moving said turn table to and away from said mold holding member, rotating said mold support platform in a predetermined sequential order to position the mold assemblies relative said pin extending from said mold holding device.

12. An apparatus as set forth in claim 11, wherein said mold holding member is configured to perform injection molding operations thereby injecting there through at least one of metallic and organic materials between the first mold portion and the second mold portion thereby molding the part.

13. An apparatus as set forth in claim 12, wherein said mold holding member is configured to perform stamping operations wherein blanks of at least one of metallic and organic materials are placed between the first mold portion and the second mold portion thereby stamping the part.

14. A method of forming parts by apparatus having a mold holding plate presenting two opposite surfaces and a pair of support members spaced from one another and extending from the mold holding plate to position the mold holding member above a manufacturing floor for receiving a plurality of mold assemblies each having a first mold portion and a second mold portion adaptable to form parts, said method comprising the steps of:
   positioning a carriage device cooperable with the mold holding plate to engage and move the mold assembly to one of the opposite surfaces;
   positioning a lifting mechanism on the other of the opposite surfaces of the mold holding member to move the carriage device relative the mold holding plate thereby moving the mold assembly to be engaged with the mold holding plate;
   positioning a device to hold the mold assemblies located thereon as the device moves to and away from the mold holding member and along the mold holding member and about a central axis of the device to position the mold assemblies on the carriage device; and
   activating the lifting mechanism to move the carriage device relative the worksurface to position the mold assemblies on the carriage device as the carriage device moves one of the mold assemblies to be engaged with one of the opposite surfaces of the mold holding member to supply a first material into the mold assembly to form a first part and returning the mold assembly back to the device to receive another mold assembly to form a second part as the device rotates relative the mold holding plate thereby continuously feeding the carriage device with the mold assemblies to facilitate continuous cycle of fabricating the first part and the second part as the device rotates about the central axis and positioning of a turn table having a base movable to and away from the mold holding plate and forming a post extending from the base and adjusting the post to various heights and rotating the post about the central axis.

15. A method as set forth in claim 14, including the step of connecting a mold support platform extending to a terminal edge and rotating the mold support platform in unison with and relative to the post with the mold support platform defining a plurality of voids located at the terminal edge to receive the mold assemblies positioned on and extending beyond the voids.

16. A method as set forth in claim 15, including the step of forming the mold support platform of a circular configuration.

17. An apparatus as set forth in claim 15, including the step of forming the mold support platform having a plurality of sections extending from a central axis in a cantilevered fashion to the terminal edge.

18. A method as set forth in claim 14, wherein the step of positioning the lifting mechanism is further defined by forming a first block presenting an engaging surface defined by a first portion and a second portion and a back side with each of the first and second portions presenting different angles defined between the first and second portions and the back side and engaging the first block with the mold holding plate.

19. A method as set forth in claim 18, including the step of connecting an actuator to one of the first and a second block with a threaded shaft extending from the actuator to one of the first and second blocks to mechanically engage one of the first block and the second block to move the first block to and away from the second block thereby moving the carriage device relative the mold holding plate at variable heights.

20. A method as set forth in claim 19, including
   the step of connecting a device to the bar element wherein the device presents a plurality of rollers to be slidably movable on the engaging surface of the first block and the other of the rollers slidably movable on the engaging surface of the second block.

21. A method as set forth in claim 14, including the step of forming at least one track on the mold holding plate to facilitate sliding movement of the first and second blocks on the mold holding plate.

22. A method as set forth in claim 14, including the step of injecting at least one of metallic and organic materials between the first mold portion and the second mold portion to form the part.

23. A method as set forth in claim 14, including the step of placing blanks of at least one of metallic and organic materials between the first mold portion and the second mold portion to stamp the part.

* * * * *